United States Patent
Haidar et al.

(10) Patent No.: US 10,384,165 B1
(45) Date of Patent: Aug. 20, 2019

(54) SOLAR DESALINATION SYSTEM

(71) Applicant: KING SAUD UNIVERSITY, Riyadh (SA)

(72) Inventors: Zeyad Abdulwahid Ghaleb Haidar, Riyadh (SA); Jamel Orfi, Riyadh (SA)

(73) Assignee: King Saud University, Riyadh (SA)

( * ) Notice: Subject to any disclaimer, the term of this patent is extended or adjusted under 35 U.S.C. 154(b) by 0 days.

(21) Appl. No.: 16/178,398

(22) Filed: Nov. 1, 2018

(51) Int. Cl.
| | | |
|---|---|---|
| *B01D 61/36* | (2006.01) | |
| *C02F 1/44* | (2006.01) | |
| *B01D 69/02* | (2006.01) | |
| *C02F 103/08* | (2006.01) | |

(52) U.S. Cl.
CPC ......... *B01D 61/366* (2013.01); *B01D 61/364* (2013.01); *B01D 69/02* (2013.01); *C02F 1/447* (2013.01); *B01D 2313/22* (2013.01); *B01D 2313/243* (2013.01); *B01D 2313/50* (2013.01); *B01D 2325/38* (2013.01); *C02F 2103/08* (2013.01)

(58) Field of Classification Search
CPC . C02F 1/043; C02F 1/14; C02F 1/447; B01D 1/0035; B01D 3/008; B01D 3/02; B01D 3/10; B01D 5/0066; B01D 61/364; B01D 61/366; B01D 69/02
See application file for complete search history.

(56) References Cited

U.S. PATENT DOCUMENTS

| | | | |
|---|---|---|---|
| 4,383,891 A * | 5/1983 | Clavier | ................ B01D 5/0066 202/234 |
| 2011/0198208 A1 | 8/2011 | Olwig et al. | |
| 2012/0260907 A1 | 10/2012 | Ba-abbad et al. | |
| 2013/0277199 A1 * | 10/2013 | Summers | ............. B01D 61/364 202/234 |
| 2014/0290247 A1 | 10/2014 | Mishima et al. | |

(Continued)

FOREIGN PATENT DOCUMENTS

| | | |
|---|---|---|
| CN | 106927531 A | 7/2017 |
| CN | 107963686 A | 4/2018 |

(Continued)

OTHER PUBLICATIONS

Trieb et al., "Concentrating solar power for seawater thermal desalination," Twelfth International Water Technology Conference, 2008 Alexandria, Egypt.

*Primary Examiner* — Jonathan Miller
(74) *Attorney, Agent, or Firm* — Richard C. Litman

(57) ABSTRACT

The solar desalination system is a hybrid system combining a Fresnel solar concentrator with a desalination chamber, and which uses membrane distillation for desalination of seawater. The desalination chamber includes a lower wall having a central absorber base, at least one sidewall, and an upper wall. A pair of hydrophobic membranes are mounted within the desalination chamber such that a central chamber is defined therebetween above the absorber base. The desalination chamber is suspended above a linear Fresnel reflector array so that the absorber base is positioned at a focal line thereof. Seawater is fed into the central chamber, where it is heated to produce water vapor, which passes through the pair of hydrophobic membranes into a pair of condensate retrieval chambers. The water vapor cools in the pair of condensate retrieval chambers, and may then be removed in the form of pure water.

9 Claims, 4 Drawing Sheets

(56) References Cited

U.S. PATENT DOCUMENTS

2015/0353379 A1* 12/2015 Lee .......................... C02F 1/14
                                                                                203/10
2017/0204838 A1    7/2017 Correia et al.

FOREIGN PATENT DOCUMENTS

EP          0039197    *  4/1981  ............ B01D 13/00
KR       100905944 B1    6/2009

* cited by examiner

SOLAR DESALINATION SYSTEM

BACKGROUND

1. Field

The disclosure of the present patent application relates to desalination of salt water, and particularly to a solar desalination system combining a Fresnel solar concentrator with a desalination chamber that uses membrane distillation.

2. Description of the Related Art

The provision of fresh water is becoming an increasingly important issue in many areas of the world. Increasing world population growth, together with increasing industrial and agricultural activities all over the world, contributes to the depletion and pollution of fresh water resources. Although water is an abundant natural resource that covers three-quarters of the planet's surface, only about 3% of all water sources are potable. Remote and arid regions depend on underground water for drinking. In arid areas, potable water is very scarce, and the establishment of a human habitat in these areas strongly depends on how such water can be made available. In some instances, the salinity is too high for water to be considered as fresh drinking water. The salinity of such brackish water varies with location. In such cases, fresh water has to be either transported over long distances or distributed through an expensive and complex water network, typically at extremely high cost for a small population.

The rapidly increasing need for energy, along with environmental concerns, has focused much attention on renewable energy sources. The use of solar energy is more economical than the use of fossil fuel, particularly in remote areas having low population densities, low rainfall, and abundant available solar energy. It would obviously be desirable to be able to effectively and efficiently use solar power to drive conventional desalination systems. Membrane distillation (MD), for example, is a thermally driven separation process in which the separation of salt from water is enabled by phase change. A hydrophobic membrane forms a barrier for the liquid phase, allowing the vapor phase (e.g., water vapor) to pass through the membrane's pores. The driving force of the process is given by a partial vapor pressure difference, commonly triggered by a temperature difference. Such membrane distillation processes can be used for desalination, and it would be desirable to be able to create the temperature difference through the use of renewable solar energy. Thus, a solar desalination system solving the aforementioned problems is desired.

SUMMARY

The solar desalination system uses solar energy to provide heat for membrane distillation of seawater. The solar desalination system includes a desalination chamber suspended above a linear Fresnel reflector array. The desalination chamber includes an upper wall, at least one sidewall and a lower wall, which define a fluid-tight hollow housing. The lower wall has an upper surface and a lower surface, and further includes a thermally conductive central portion defining an absorber base, and first and second thermally insulating portions above and below the absorber base. The absorber base is positioned at a focal line of the linear Fresnel reflector array.

The at least one sidewall has opposed upper and lower edges, such that the lower edge is secured to the upper surface of the lower wall and the upper edge is secured to the upper wall. The at least one sidewall has an inlet port and first and second condensate retrieval ports. First and second hydrophobic membranes are mounted within the hollow housing, so that a central chamber is defined between the first and second hydrophobic membranes, and first and second condensate chambers are respectively defined between the at least one sidewall and the first and second hydrophobic membranes. The inlet port is in fluid communication with the central chamber, and the first and second condensate retrieval ports are in respective fluid communication with the first and second condensate chambers. The central chamber is positioned above the absorber base, and the first and second condensate chambers are respectively positioned above the first and second insulating portions.

A seawater conduit has an outlet in fluid communication with the central chamber through the inlet port, and a condensate retrieval conduit has first and second inlets respectively in fluid communication with the first and second condensate chambers through the first and second condensate retrieval ports, respectively. A closed, optically transparent housing may be secured to and cover a lower surface of the absorber base. A vacuum may be formed between the closed, optically transparent housing and the lower surface of the absorber base.

In use, the seawater conduit delivers seawater to the central chamber, where the seawater is heated by the absorber base, which absorbed solar energy from the Fresnel reflectors, to heat water without boiling it. Fresh water at ambient temperature is circulated inside the condensate chambers. The temperature difference across the membrane causes a vapor partial pressure difference with high pressure at the heated seawater inside the central chamber. This pressure difference causes the formed water vapor to pass through the first and second hydrophobic membranes into the first and second condensate chambers, respectively, where the water vapor cools to form pure water condensate. The pure water condensate is then extracted from the first and second condensate chambers by the first and second inlets, respectively, of the condensate retrieval conduit. The seawater may be initially held in a seawater tank. A first pump is provided for selectively transferring the seawater from the seawater tank to the central chamber through the seawater conduit. Additionally, the pure water condensate may be received by and stored within a pure water tank. A second pump selectively transfers the pure water condensate to the pure water tank through the condensate retrieval conduit.

These and other features of the present disclosure will become readily apparent upon further review of the following specification and drawings.

DETAILED DESCRIPTION OF THE PREFERRED EMBODIMENTS

Figure 1:
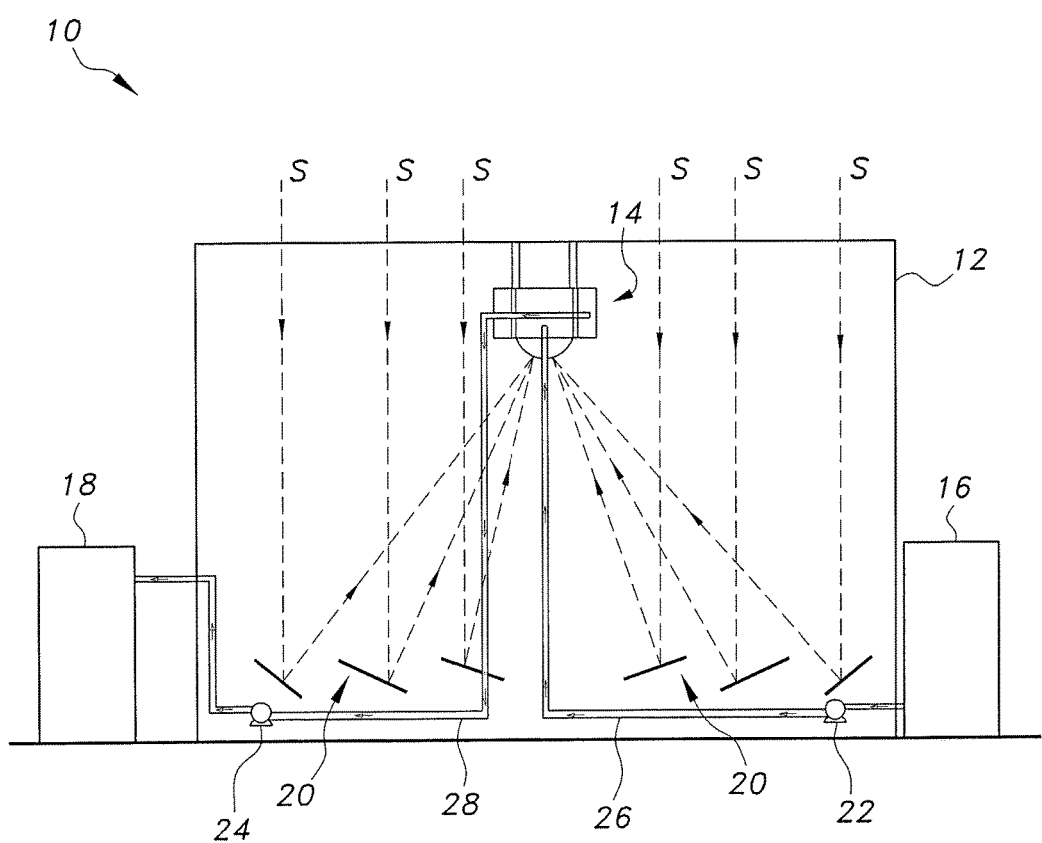
FIG. 1 is a schematic diagram of a solar desalination system.
Figure 2:
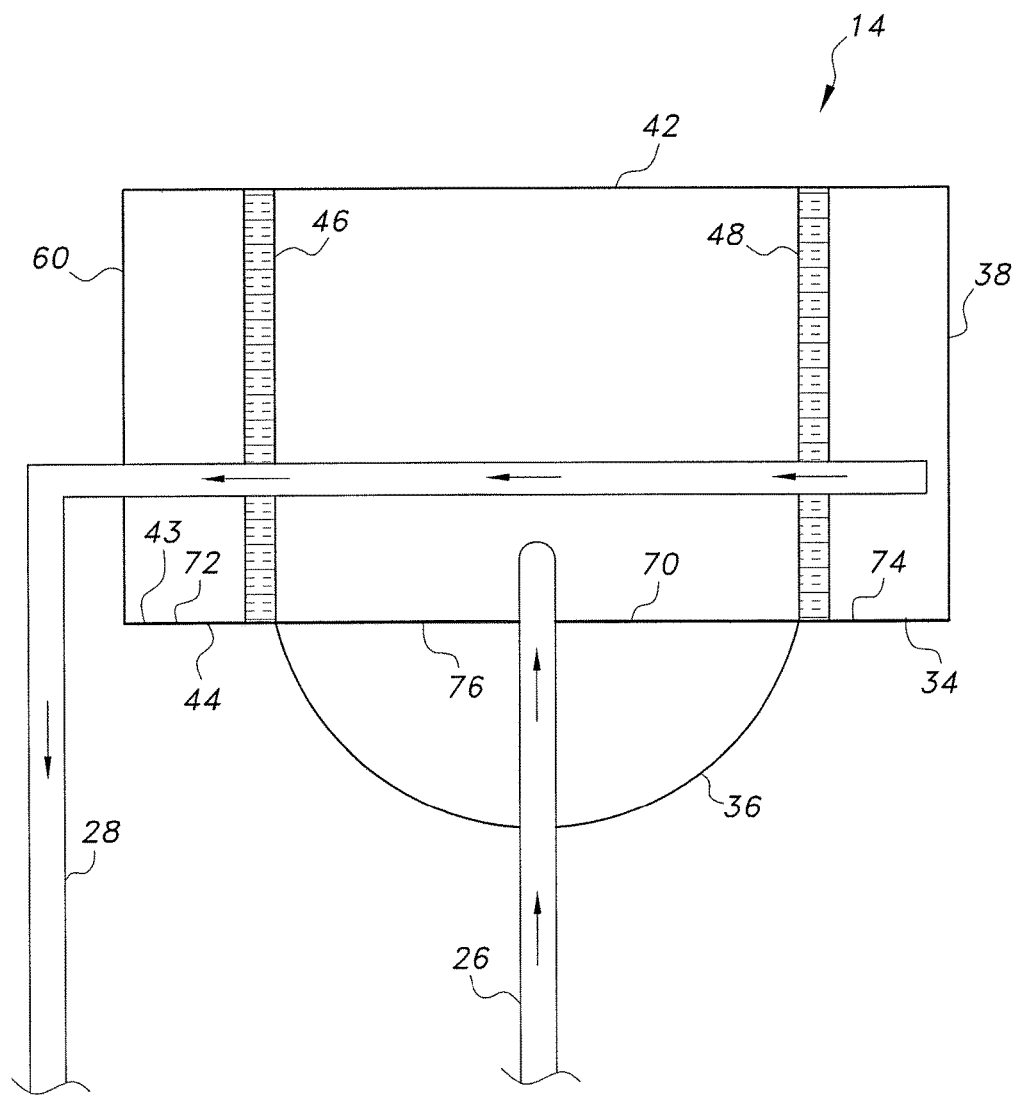
FIG. 2 is a schematic diagram of the desalination chamber of the solar desalination system of FIG. 1, as seen from the front.

Referring to FIG. 1, the solar desalination system 10 uses solar energy to provide heat for membrane distillation of seawater. The solar desalination system 10 includes a desalination chamber 14 suspended above a linear Fresnel reflector array 20. As best shown in FIG. 2, the desalination chamber 14 includes an upper wall 42, at least one sidewall 38 and a lower wall 34, which define a fluid-tight hollow housing 60. The lower wall 34 has an upper surface 43 and a lower surface 44. The lower wall 34 includes a thermally conductive central portion defining an absorber base 70, and first and second thermally insulation sections or portions 72, 74 extending on opposite sides of the absorber base 70. The absorber base 70 is positioned at a focal line of the linear Fresnel reflector array 20. The absorber base may, e.g., be made from a metal having high thermal conductivity, such as copper or aluminum, and may be painted black or a dark color to absorb heat from the Fresnel mirrors of the reflector array 20, which will readily be transferred to and absorbed by water in the desalination chamber 14.

Figure 3:
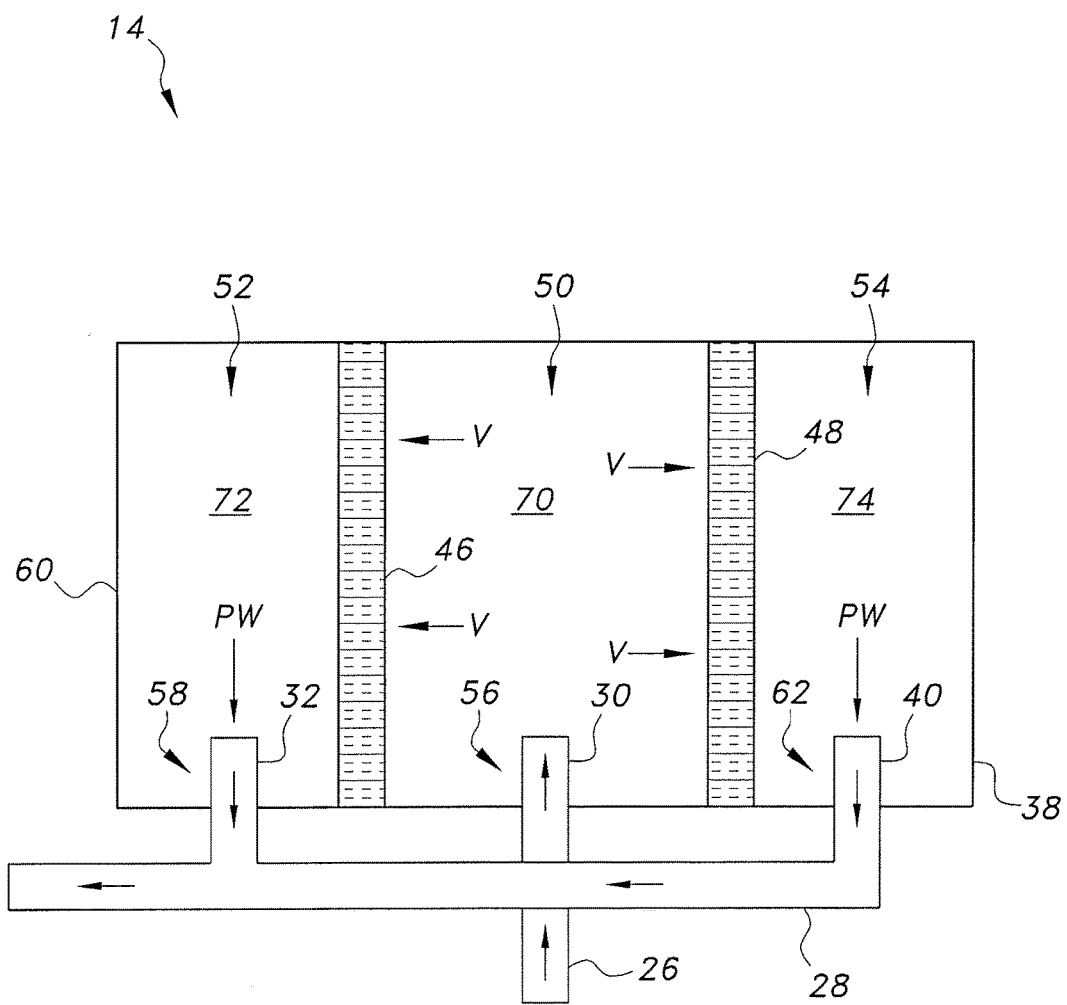
FIG. 3 is a schematic diagram of the desalination chamber of FIG. 2, as seen from the top.
Figure 4:
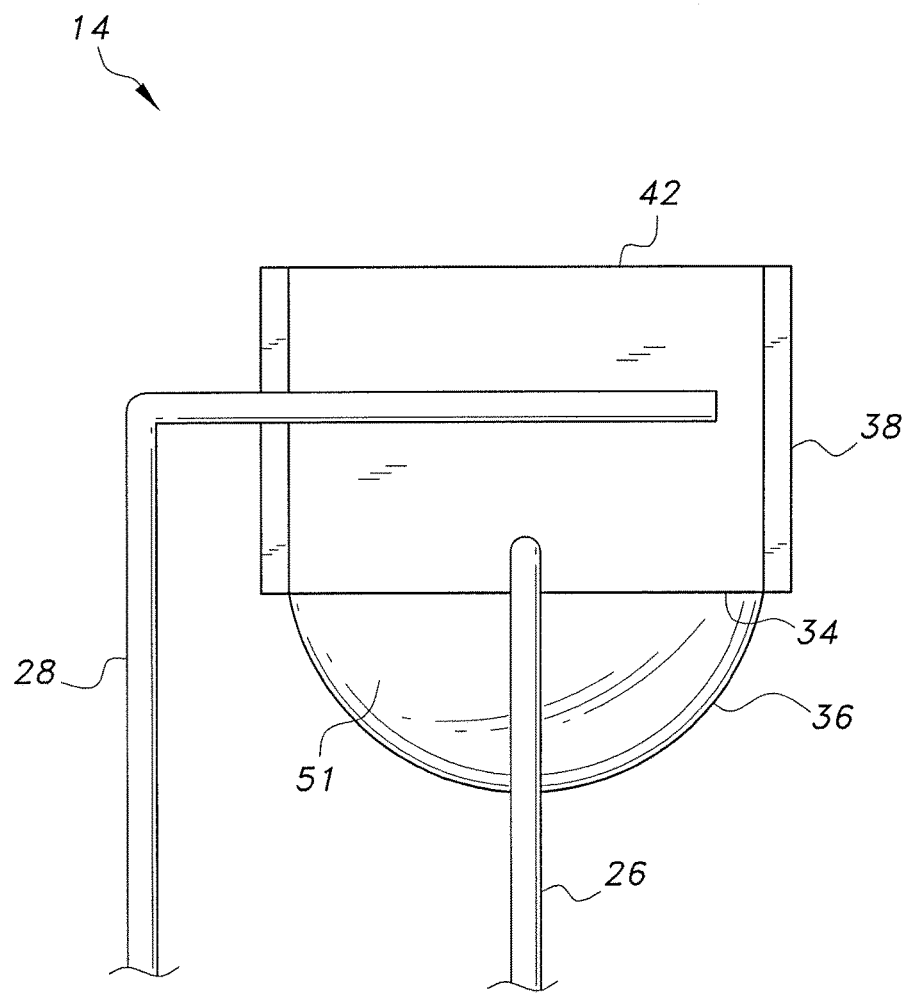
FIG. 4 is a detailed front view of the desalination chamber of FIG. 2.

In FIGS. 2 and 3, the lower wall 34 and the upper wall 42 are shown as being rectangular, and the at least one sidewall 38 is shown as four corresponding walls, defining a rectangular interior. It should be understood that the overall configuration and relative dimensions of the lower wall 34, upper wall 42 and the at least one sidewall 38 are shown for exemplary purposes only. Further, in FIGS. 2 and 3, the desalination chamber 14 is shown as being open. It should be understood that this open configuration is shown for purposes of clarity and illustration only. As shown in FIG. 4, the desalination chamber 14 (in the rectangular example described above) is enclosed, defining a fluid-tight chamber.

The at least one sidewall 38 has opposed upper and lower edges, so that the lower edge is secured to the upper surface 43 of the lower wall 34 and the upper edge is secured to the upper wall 42. As shown in FIG. 3, the at least one sidewall 38 has an inlet port 56 and first and second condensate retrieval ports 58, 62, respectively. First and second hydrophobic membranes 46, 48, respectively, are mounted within the hollow housing 60, such that a central chamber 50 is defined therebetween, and first and second condensate chambers 52, 54 are respectively defined between the at least one sidewall 38 and the first and second hydrophobic membranes 46, 48. The inlet port 56 is in fluid communication with the central chamber 50, and the first and second condensate retrieval ports 58, 62, are in fluid communication with the first and second condensate chambers 52, 54, respectively. The central chamber 50 is positioned above the absorber base 50, and the first and second condensate chambers 52, 54 are respectively positioned above the first and second insulation portions 72, 74.

It should be understood that the absorber base 70 may be made from any suitable type of metal or material having a high degree of thermal conductivity and a high melting temperature. The at least one sidewall 38, the upper wall 42 and the first and second insulating portions 72, 74 may be made from any suitable type of material having a high degree of thermal insulation and/or may be covered by an additional layer of thermal insulation material.

A seawater conduit 26 has an outlet 30 in fluid communication with the central chamber 50 through the inlet port 56. A condensate retrieval conduit 28 has first and second inlets 32, 40, respectively, in fluid communication with the first and second condensate chambers 52, 54 through the first and second condensate retrieval ports 58, 62, respectively. Additionally, a closed, optically transparent housing 36 may be secured to and cover the lower surface 76 of the absorber base 70. A vacuum may be formed between the closed, optically transparent housing 36 and the lower surface 76 of the absorber base 70. The closed, optically transparent housing 36 is provided to prevent heat loss from the absorber base 34 through convective heat transfer with the ambient environment. The vacuum is formed within the closed, optically transparent housing 36 to further enhance the thermal insulation. In FIG. 2, the optically transparent housing 36 is shown as being open. It should be understood that this open configuration is shown for purposes of clarity and illustration only. FIG. 4 shows an additional front wall 51, it being understood that there should be an additional rear wall, thus forming a closed housing. The closed, optically transparent housing 36 allows the focused solar radiation S to reach the absorber base 34 without environmental air extracting heat therefrom through convective heat transfer.

In use, the seawater conduit 26 delivers seawater to the central chamber 50, where the seawater is heated by the absorber base 70. As noted above, the absorber base 70 is positioned above the focal line of the linear Fresnel reflector array 20. In FIG. 1, it should be understood that the linear Fresnel reflector array 20, which is used to focus solar radiation S on absorber base 70, is shown in a simplified manner for purposes of illustration and clarity. The desalination chamber 14 is supported by any suitable type of support structure 12, such that absorber base 70 is located at the focal line of the linear Fresnel reflector array 20.

The absorber base 70 is thermally conductive, thus allowing heat transfer to the seawater in the central chamber 50. As the seawater is heated, the water partial pressure increases until the vapor pressure across the membrane causes the water vapor to form at the hot surface of the membrane and pass through the first and second hydrophobic membranes 46, 48 into the first and second condensate chambers 52, 54, where the water vapor V cools to form pure water condensate PW. As noted above, the first and second thermally insulating portions 72, 74 are disposed on opposite sides of the absorber base 70 such that the first and second condensate chambers 52, 54 are positioned above the first and second thermally insulating portions 72, 74, respectively, which form the floors of the chambers 52, 54. The heat transfer between the absorber base 70 and the interior of housing 60 is limited to the central chamber 50, the first and second thermally insulation portions 72, 74 maintaining the first and second condensate chambers 52, 54, respectively, at a temperature below the vaporization point of water.

The pure water condensate PW is then extracted from the first and second condensate chambers 52, 54 by the first and second inlets 32, 40, respectively, of the condensate retrieval conduit 28. As shown in FIG. 1, the seawater may be initially held in a seawater tank 16. A first pump 22 is provided for selectively transferring the seawater from the seawater tank 16 to the central chamber 50 through the seawater conduit 26. Additionally, the pure water condensate PW may be received by and stored within a pure water tank 18. A second pump 24 selectively transfers the pure water condensate PW to the pure water tank 18 through the condensate retrieval conduit 28.

By adjusting the reflectors of the linear Fresnel reflector array 20, the temperature of the seawater within the central chamber 50 may be maintained at slightly above 100° C. The temperature within the condensate retrieval chambers 52, 54 is below 100° C., and this temperature differential creates a corresponding differential in water vapor pressure across each of membranes 46, 48. This pressure difference causes the water vapor V to pass through membranes 46, 48 into, respectively, the first and second condensate retrieval chambers 52, 54.

It is to be understood that the solar desalination system is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A solar desalination system, comprising:
    a desalination chamber consisting of:
        a lower wall having an upper surface and a lower surface, the lower wall having a thermally conductive central portion defining an absorber base and first and second thermally insulation portions extending on opposite sides of the absorber base;
        at least one sidewall having opposed upper and lower edges, the lower edge being secured to the upper surface of the lower wall, the at least one sidewall having an inlet port and first and second condensate retrieval ports;
        an upper wall secured to the upper edge of the at least one sidewall, the upper wall, the at least one sidewall and the lower wall define a hollow housing; and
        first and second hydrophobic membranes mounted within the hollow housing, a central chamber being defined between the first and second hydrophobic membranes, and first and second condensate chambers being defined between the at least one sidewall and the first and second hydrophobic membranes, the inlet port being in fluid communication with the central chamber, and the first and second condensate retrieval ports being in fluid communication with the first and second condensate chambers, respectively, the central chamber being positioned above the absorber base, and the first and second condensate chambers being positioned above the first and second insulation portions, respectively;
    a seawater conduit having an outlet in fluid communication with the central chamber through the inlet port;
    a condensate retrieval conduit having first and second inlets in fluid communication with the first and second condensate chambers through the first and second condensate retrieval ports, respectively; and
    a linear Fresnel reflector array, the desalination chamber being suspended above the linear Fresnel reflector array such that the absorber base is positioned at a focal line of the linear Fresnel reflector array,
    whereby the seawater conduit delivers seawater to the central chamber, the seawater being heated by solar energy reflected by the linear Fresnel reflector array to the absorber base to above 100° C. to produce water vapor, the water vapor passing through the first and second hydrophobic membranes into the first and second condensate chambers, respectively, wherein the temperature is below 100° C., the water vapor cooling in the condensate chambers to form pure water in liquid form, the liquid pure water being removed from the first and second condensate chambers by the first and second inlets of the condensate retrieval conduit, respectively.

2. The solar desalination system as recited in claim 1, further comprising a closed, optically transparent housing secured to and covering the absorber base from below the desalination chamber.

3. The solar desalination system as recited in claim 2, wherein the closed, optically transparent housing and the absorber base define a space maintained under vacuum.

4. The solar desalination system as recited in claim 1, further comprising:
    a seawater tank adapted for holding the seawater prior to introduction to the desalination chamber; and
    a first pump selectively transferring the seawater from the seawater tank to the central chamber through the seawater conduit.

5. The solar desalination system as recited in claim 4, further comprising:
    a pure water tank adapted for receiving the liquid pure water; and
    a second pump selectively transferring the liquid pure water to the pure water tank through the condensate retrieval conduit.

6. A solar desalination system, comprising:
    a desalination chamber consisting of:
        a lower wall having an upper surface and a lower surface, the lower wall having a thermally conductive central portion defining an absorber base and first and second thermally insulating portions extending on opposite sides of the absorber base;
        at least one sidewall having opposed upper and lower edges, the lower edge being secured to the upper surface of the lower wall, the least one sidewall having an inlet port and first and second condensate retrieval ports;
        an upper wall secured to the upper edge of the at least one sidewall, the upper wall, the at least one sidewall and the lower wall defining a hollow housing; and
        first and second hydrophobic membranes mounted parallel to each other within the hollow housing, a central chamber being defined between the first and second hydrophobic membranes, and first and second condensate chambers being defined between the at least one sidewall and the first and second hydrophobic membranes, the inlet port being in fluid communication with the central chamber, and the first and second condensate retrieval ports being in fluid communication with the first and second condensate chambers, the central chamber being positioned above the absorber base, and the first and second condensate chambers being positioned above the first and second insulation portions, respectively;
    a seawater conduit having an outlet in fluid communication with the central chamber through the inlet port;
    a condensate retrieval conduit having first and second inlets in fluid communication with the first and second condensate chambers through the first and second condensate retrieval ports, respectively;
    a closed, optically transparent housing secured to and covering the absorber base below the desalination chamber; and
    a linear Fresnel reflector array, the desalination chamber being suspended above the linear Fresnel reflector array such that the absorber base is positioned at a focal line of the linear Fresnel reflector array, whereby the seawater conduit delivers seawater to the central chamber, the seawater being heated by solar energy reflected by the Fresnel array to the absorber base to above 100° C. to produce water vapor, the water vapor passing through the first and second hydrophobic membranes into the first and second condensate chambers, respectively, wherein the temperature is below 100° C., where the water vapor cools to form pure water in liquid form, the liquid pure water being removed from the first and second condensate chambers by the first and second inlets, respectively, of the condensate retrieval conduit.

7. The solar desalination system as recited in claim 6, wherein the closed, optically transparent housing and the absorber base define a space maintained under vacuum.

8. The solar desalination system as recited in claim 6, further comprising:
   a seawater tank adapted for holding the seawater prior to introduction to the desalination chamber; and
   a first pump selectively transferring the seawater from the seawater tank to the central chamber through the seawater conduit.

9. The solar desalination system as recited in claim 8, further comprising:
   a pure water tank adapted for receiving the pure water in liquid form; and
   a second pump selectively transferring the pure water in liquid form to the pure water tank through the condensate retrieval conduit.

\* \* \* \* \*